United States Patent [19]

Hoffman et al.

[11] Patent Number: 5,633,340
[45] Date of Patent: May 27, 1997

[54] POLYESTER MOLDING COMPOSITIONS

[75] Inventors: Douglas C. Hoffman; Thomas J. Pecorini; James P. Dickerson, all of Kingsport; Joseph A. DeLoach, Jonesborough, all of Tenn.

[73] Assignee: Eastman Chemical Company, Kingport, Tenn.

[21] Appl. No.: 531,495

[22] Filed: Sep. 21, 1995

[51] Int. Cl.$^6$ .................................................. C08G 63/02
[52] U.S. Cl. ..................... 528/272; 222/92; 264/176.1; 426/106; 426/533; 426/534; 428/34.1; 428/35.7; 428/36.9; 428/158; 493/960; 525/173; 525/176; 525/425; 528/176; 528/192; 528/194; 528/271
[58] Field of Search .................... 528/176, 192, 528/193, 194, 220, 271, 272, 295; 525/173, 176, 425; 264/176.1; 426/106, 533, 534; 424/49; 222/92; D4/104; 493/960; 428/34.1, 35.7, 36.9, 158, 480

[56] References Cited

U.S. PATENT DOCUMENTS

| | | | |
|---|---|---|---|
| 2,901,466 | 8/1959 | Kibler et al. | 528/288 |
| 4,548,978 | 10/1985 | Garrison, Jr. | 524/314 |
| 4,994,512 | 2/1991 | Weaver et al. | 524/209 |
| 5,030,708 | 7/1991 | Krutak et al. | 528/272 |
| 5,102,980 | 4/1992 | Krutak et al. | 528/272 |
| 5,194,571 | 3/1993 | Weaver et al. | 528/272 |
| 5,219,941 | 6/1993 | Meyer, Jr. et al. | 525/173 |
| 5,292,783 | 3/1994 | Buchanan et al. | 524/37 |

OTHER PUBLICATIONS

Magill, J. H., "A New Method for Following Rapid Rates of Crystallization", I. Poly (hexamethylene adipamide), Polymer, vol. 2, (1961), pp. 221-233.

Adams and Stein, J. Polymer Sci. A2, vol. 6 (1962).

*Primary Examiner*—Terressa Mosley
*Attorney, Agent, or Firm*—Betty J. Boshears; Harry J. Gwinnell

[57] ABSTRACT

This invention relates to a molded object prepared from a copolyester having an inherent viscosity of 0.4 to 1.1 dL/g, wherein the acid component comprises repeat units from 90 to 40 mole % terephthalic acid and from 10 to 60 mole % of one or more additional dibasic acids selected from the group consisting of isophthalic acid, cyclohexanedicarboxylic acid, naphthalenedicarboxylic acid, diphenyldicarboxylic acid, and stilbenedicarboxylic acid;

wherein the glycol component comprises repeat units from 1,4-cyclohexanedimethanol.

39 Claims, 2 Drawing Sheets

POLYESTER MOLDING COMPOSITIONS

This invention relates to certain molded objects comprising poly(1,4-cyclohexylenedimethylene terephthalate) copolyesters which have improved toughness, clarity and stress crack resistance.

BACKGROUND OF THE INVENTION

Various polymeric materials have been widely used over the past 60 years for molding toothbrushes, tool handles, windshield scrapers, steering wheels, hair brushes, cutlery, eyeglass frames and the like. In many of these applications, the molded part must be clear, tough, impact resistant, stress crack resistant, hydrolysis resistant as well as having a pleasing feel and appearance.

Plasticized cellulose acetate propionate (CAP) compositions have been used successfully in the past for toothbrush handles. Such compositions have good clarity, sparkle and overall appearance. However, design changes in toothbrush handles to increase the bristle density has led to cracking in certain brushes. The cracks which occur during bristle insertion are a result of insufficient weld-line strength. Increased plasticizer concentrations improve the weld-line strength but this leads to decreased stiffness which can result in inadequate bristle retention.

Certain rigid polyurethane materials have been evaluated in this application but this polymer is difficult to mold, and the urethane linkages in the polymer chain can hydrolyze in the presence of moisture during molding.

Polyester materials such as poly(ethylene terephthalate) (PET) and poly(1,4-cyclohexylenedimethylene terephthalate) (PCT) have many desirable properties for molded parts but these polymers are readily crystallizable and provide hazy or opaque objects when molded in thick parts. Modification of PET polymers with high levels of glycol components other than ethylene glycol provide clear, tough molded parts but they tend to stress crack in the presence of certain toothpaste solutions containing mint oil.

For example, U.S. Pat. No. 2,901,466 (1959) assigned to Eastman Kodak Company describes a wide range of linear polyesters and polyesteramides derived from 1,4-cyclohexanedimethanol (CHDM). Many of the compositions are readily crystallizable and molded parts are hazy or opaque. Thus, they are not suitable for clear, molded objects.

There is a need in the art, therefore, for molding compositions which have visual clarity and which have improved molding and physical property requirements.

SUMMARY OF THE INVENTION

This invention relates to molded objects prepared from a copolyester having an inherent viscosity of 0.4 to 1.1 dL/g, wherein the acid component comprises repeat units from 90 to 40 mole % terephthalic acid and from 10 to 60 mole % of one or more additional dibasic acids selected from the group consisting of isophthalic acid, cyclohexanedicarboxylic acid, naphthalenedicarboxylic acid, diphenyldicarboxylic acid, and stilbenedicarboxylic acid; and, wherein the glycol component comprises repeat units from 1,4-cyclohexanedimethanol.

These molded objects have the advantage of having improved clarity and stress crack resistance. They also have good physical properties including strength, stiffness, impact resistance and hydrolysis resistance.

DESCRIPTION OF THE INVENTION

It has been found that certain PCT copolyesters are highly suitable for molding clear, tough, stress crack resistant parts.

The molded objects are prepared from a copolyester having an inherent viscosity of 0.4 to 1.1 dL/g, where the acid component comprises repeat units from 90 to 40 mole %, preferably 85 to 52 mole %, more preferably, 83 to 52 mole % terephthalic acid and from 10 to 60 mole %, preferably 15 to 48 mole, preferably 17 to 48 mole %, of one or more additional dibasic acids selected from the group consisting of isophthalic acid, cyclohexanedicarboxylic acid, naphthalenedicarboxylic acid, diphenyldicarboxylic acid, and stilbenedicarboxylic acid;

where the glycol component comprises repeat units from 1,4-cyclohexanedimethanol, preferably 80 to 100 mole % 1,4-cyclohexanedimethanol, more preferably, 85 to 100 mole %, even more preferably 90 to 100 mole %, and even more preferably 95 to 100 mole %.

When using the cyclohexanedicarboxylic acids, they may be in the cis or trans forms or as cis/trans isomer mixtures. The lower alkyl esters, such as the methyl esters, may be used instead of the dibasic acids in preparing the molding compositions of this invention.

When cyclohexanedicarboxylic acid is used, 1,3- and 1,4-cyclohexanedicarboxylic acid are preferred. When naphthalenedicarboxylic acid is used, 2,6-, 2,7-, 1,4-and 1,5-naphthalenedicarboxylic acid are preferred.

The molded objects of the invention, may comprise up to 10 mole % of even further additional dibasic acids. These dibasic acids may be selected from one or more of the group consisting of aromatic dicarboxylic acids, aliphatic dicarboxylic acids, and cycloaliphatic dicarboxylic acids, each preferably having 4 to 40 carbon atoms. More specifically, these additional dibasic acids can be selected from one or more of the group consisting of phthalic acid, cyclohexanediacetic acid, succinic acid, glutaric acid, adipic acid, azelaic acid, sebacic acid, isophthalic acid, cyclohexanedicarboxylic acid, naphthalenedicarboxylic acid, diphenyldicarboxylic acid, and stilbenedicarboxylic acid.

Preferred additional carboxylic acids are selected from the group consisting of isophthalic acid, cyclohexanedicarboxylic acid, naphthalenedicarboxylic acid, diphenyldicarboxylic acid, and stilbenedicarboxylic acid. Even more preferred additional dibasic acids include isophthalic acid, cyclohexanedicarboxylic acid and naphthalenedicarboxylic acid.

The glycol component may contain up to 20 mole % of one or more additional aliphatic or alicyclic glycols, preferably containing 2 to 20 carbon atoms. These additional glycols may be selected from the group consisting of ethylene glycol, diethylene glycol, triethylene glycol, propanediol, butanediol, pentanediol, hexanediol, neopentyl glycol and tetramethylcyclobutanediol. Ethylene glycol is particularly preferred.

Very small amounts (less than 1.5 mole %) of certain branching agents such as trimellitic anhydride, trimellitic acid, pyromellitic dianhydride, trimesic acid, hemimellitic acid, glycerol, trimethylolpropane, pentaerythritol, 1,2,4-butanetriol, 1,2,6-hexanetriol, sorbitol, 1,1,4,4-tetrakis (hydroxymethyl)cyclohexane, dipentaerythritol and the like may be used.

The copolyesters of this invention are readily prepared using melt phase or solid state polycondensation procedures well known in the art. They may be made by batch or continuous processes. Examples of these processes can be found in U.S. Pat. Nos. 4,256,861, 4,539,390, and 2,901,466 and include preparation by direct condensation or by ester interchange.

Specifically, the polymers of this invention may be prepared according to the methods described in U.S. Pat. No. 2,901,466. However, the preparation of the polymers of this invention is not particularly limited to the method described in U.S. Pat. No. 2,901,466. This patent discloses interchange reactions as well as polymerization build-up processes. Briefly, a typical procedure consists of at least two distinct stages; the first stage, known as ester-interchange or esterification, is conducted under an inert atmosphere at a temperature of 150° to 250° C. for 0.5 to 8 hours, preferably from 180° to 240° C. for 1 to 4 hours. The glycols, depending on their reactivities and the specific experimental conditions employed, are commonly used in molar excesses of 1.05–2.5 per total moles of acid-functional monomers. The second stage, referred to as polycondensation, is conducted under reduced pressure at a temperature of 230° to 350° C., preferably 265 to 325° C., and more preferably 270° to 300° C. for 0.1 to 6 hours, preferably 0.25 to 2 hours. Stirring or appropriate conditions are used in both stages to ensure adequate heat transfer and surface renewal of the reaction mixture. The reactions of both stages are facilitated by appropriate catalysts, especially those well-known in the art, such as alkoxy titanium compounds, alkali metal hydroxides and alcoholates, salts of organic carboxylic acids, alkyl tin compounds, metal oxides, and so forth.

Suitable copolyesters will have inherent viscosity (I.V.) values of about 0.4 to about 1.1 dL/g. Such values are obtained in a 60/40 phenol/tetrachlorethane solution containing 0.5 grams (g) of polymer in 100 milliliters (mL) of solution. It is preferred that the copolyesters have I.V. values of at least 0.5 dL/g.

Preferred copolyesters must have glass transition temperatures (Tg) of at least 70° C. as determined by Differential Scanning Calorimetry (DSC) and a crystallization half-time of at least 1 minute as measured by a small angle laser light scattering technique.

The technique for determining the crystallization haze half-times consists primarily in following the increase in depolarization of plane-polarized light by the polyester. The method used in this invention is primarily that shown in "A New Method for Following Rapid Rates of Crystallization", I. Poly (hexamethylene adipamide), J. H. Magill, Polymer, Vol. 2, page 221–233 (1961) with the exception that Magill uses a polarizing microscope as the source of light and light-collection lenses. In measuring the crystallization half-times of the present invention, a helium-neon laser [with a small angle light scattering technique (SALS)] was used as was shown by Adams and Stein in J. Polymer Sci. A2, Vol. 6 (1962).

Crystallization half-times are measured at the time in which the transmitted intensity is half of the maximum intensity achieved.

The method used is generally as follows:

(1) Melt the sample to remove existing crystallinity;
(2) Crystallize the sample polyester at a predetermined temperature;
(3) Record the transmitted light intensity plotted versus time;
(4) Find the time at which the transmitted intensity is half of the maximum intensity achieved.

The above procedure is repeated at different temperatures until a minimum value for the crystallization half-time can be measured. "Minimum value" refers to the lowest measurable point on a curve plotted using the temperature data and corresponding crystallization half-time data.

The term "crystallization haze half-time as measured from the melt phase" as defined herein is the procedure as describe above.

It is preferred that the molded objects of the invention have a crystallization haze half-time of greater than 1 minute, preferably greater than 3 minutes, and more preferably greater than 5 minutes.

When the molded objects of the invention have crystallization haze half-times as described, they are generally visually clear for regions of a molded object having a thickness of from 1 to 11.5 mm, preferably 3 to 11.5."

It is also preferable that molded objects prepared from the blends of the invention have a diffuse transmittance value of less than about 60%, more preferably, less than about 40%, and more preferably, less than about 20% as determined by ASTM Method D1003. When the diffuse transmittance value is less than about 60%, the molded objects are visually clear.

Also, the molded objects of the invention demonstrate improved stress cracking resistance as determined for test specimens which are 0.32 centimeters thick under a flexural load with 1.4% strain and with 2.7% strain and as demonstrated more fully in the following Examples.

This stress cracking resistance testing is preferably performed in the presence of a flavorant. More preferably, the flavorant is a mint oil. Of the possible mint oils, it is preferable that the mint oil is either peppermint oil or spearmint oil.

The stress cracking resistance measurements used in the invention are also preferably performed in the presence of a toothpaste solution comprising water and a toothpaste containing greater than 0.6 weight % mint oil or, more specifically, in the presence of peppermint oil directly as described more fully in the following Examples.

Other ingredients may be used in the toothpaste solutions including glycerine, sodium bicarbonate, water, hydrated silicate, polyethylene glycol, sodium laural sulfate, sodium laural sarcosinate, sodium pyrophosphates, sodium phosphates, sorbitol, sodium benzoate, sodium saccharin, xantham gum, cellulose gum, flavorants, sodium saccharin, FD&C blue #1 and FD&C yellow #10, FD&C red 30, 1-hydroxy-2-propanone, 3-octanol, 4-methyl-1-(1-methylethyl)cyclohexene, pulegone, dodecanol, 3-phenyl-2-propenal, dodecanol, eugenol and titanium dioxide.

Flavorants useful in performing the tests of the invention include peppermint oil, curly mint oil, anise oil, Japanese anise oil, caraway oil, eucalyptus oil, fennel oil, cinnamon oil, clove oil, geranium oil, sage oil, pimento oil, thyme oil, and majoram oil.

Mint oil may contain several ingredients including, but not limited to: limonene, cineole, menthone, menthol, and carvone.

The copolyesters may be used in clear form or they may be colored or pigmented with additives or copolymerizable colorants. Typically useful copolymerizable colorants are described in U.S. Pat. Nos. 5,030,708 (1991), 5,102,980 (1992) and 5,194,571 (1993) all assigned to Eastman Kodak Company, incorporated herein by reference.

Other additives such as stabilizers, antioxidants, mold release agents, fillers and the like may also be used if desired. Polymer blends may be used.

The copolyesters of this invention are easy to mold into desired shapes such as toothbrush handles, hair brush handles, ice scrapers, cutlery or cutlery handles, tool handles, automotive steering wheels, eyeglass frames and the like. This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated. Percentages are by weight unless otherwise stated.

I. PREPARATION OF COPOLYESTERS AND MOLDED OBJECTS

Figure 1:
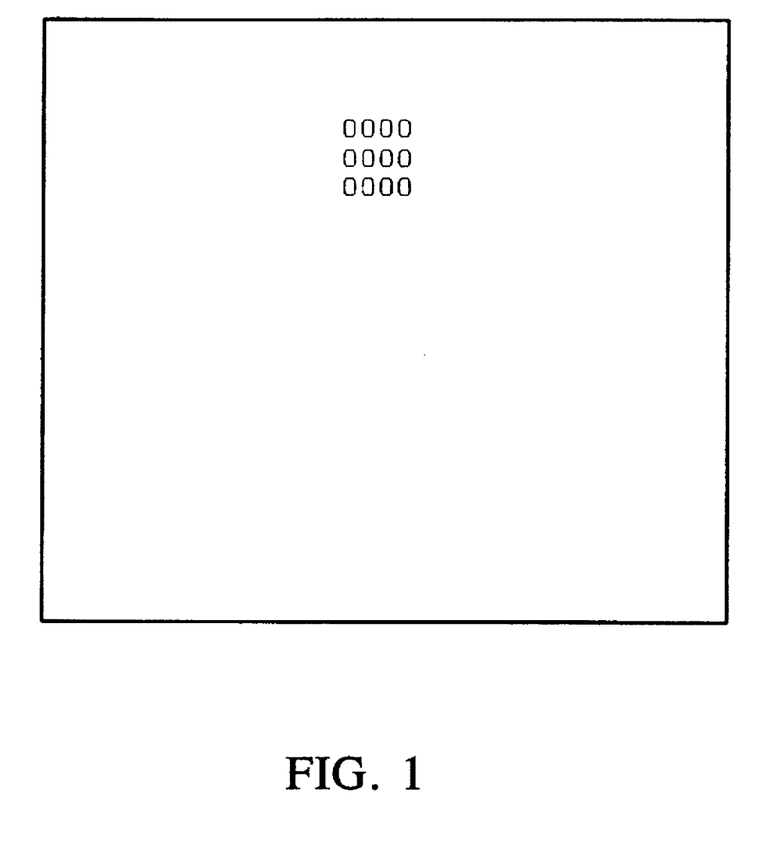
FIG. 1 illustrates the molded plaques used to determine chemical resistance

Example 1—Comparative—Preparation of Copolyesters containing terephthalate, ethylene glycol and 3 mole % 1,4-cyclohexanedimethanol A 5000 mL stainless steel reactor equipped with an agitator shaft, nitrogen inlet, and an outlet to allow for removal of volatile materials was charged with 679.7 grams (3.5 mole) of dimethyl terephthalate (DMT), 427.8 grams (6.9 mole) of ethylene glycol (EG), 16.4 grams (0.11 mole) of 1,4-cyclohexanedimethanol (CHDM) (70% trans isomer/ 30% cis isomer) and 1.35 mL of a 3.30% (w/v) solution of titanium (IV) isopropoxide in n-butanol. The reactor was purged with nitrogen and heated to 200° C. under a slow nitrogen sweep with agitation and held for one hour. The reactor temperature was raised to 220° C. and held for two hours. The temperature was raised to 280° C. and the nitrogen purge was removed and a vacuum was applied such that a vacuum of <0.5 mm was attained over a 30 minute period. The reactor was stirred under vacuum for one hour. The vacuum was then displaced with a nitrogen atmosphere and the polymer was extruded through an opening in the bottom of the reactor. The extruded rod was cooled in an 5° C. water bath and pelletized. The recovered polymer pellets had an inherent viscosity of 0.70 deciliters (dL)/g according to ASTM D3835-79. The diol component of the polymer consisted of 96 mole % EG, 3 mole % CHDM and 1 mole % diethylene glycol (DEG) as measured by gas chromatography on a hydrolyzed sample. A glass transition temperature ($T_g$) of 78° C. and a melting point ($T_m$) of 248° C. were measured by DSC (differential scanning calorimetry) analysis. The crystallization haze half-time as measured from the melt phase was 0.8 minutes. The sample was dried at 150° C. in a dehumidifier drier for about 4 hours and injection molded into clear plaques that were 7.5 centimeters (cm) square and 0.32 cm thick. Located approximately 1 cm from the plaque edge was an area 1.1, cm by 0.6 cm which contains twelve holes approximately 0.1 cm in diameter as shown in FIG. 1. This area of the plaque was used to simulate the head of a toothbrush into which bristles would be inserted.

Example 2—Comparative—Preparation of Copolyester containing terephthalate, EG and 31 mole % CHDM The apparatus and procedure set forth in Example 1 was used. The following amounts of reactants were charged to the reactor: 679.5 grams (3.5 mole) DMT, 365.6 grams (5.9 mole) EG, 160.4 grams (1.1 mole) CHDM and 2.05 mL of a 3.30% (w/v) solution of titanium isopropoxide in n-butanol. The diol interchange step was conducted at 200° C. for one hour and at 210° C. for two hours. The polycondensation step was conducted at a vacuum of 0.5 mm Hg for one hour. The polymer was extruded from the bottom of the reactor. The extruded rod was cooled in an 5° C. water bath and pelletized. The recovered polymer pellets had an inherent viscosity of 0.74 dL/g. The diol component of the polymer consisted of 68 mole % EG, 31 mole % CHDM and 1 mole % DEG. The amorphous copolymer possessed a $T_g$ of 80° C. as determined by DSC analysis. The crystallization haze half-time as measured from the melt phase was greater than 1 hour. The sample was dried at 65° C. in a dehumidifier drier for about 16 hours. It was injection molded into clear specimens set forth in Example 1.

Example 3—Comparative—Preparation of Copolyester containing terephthalate, EG and 62 mole % CHDM The apparatus and procedure set forth in Example 1 was used. The following amounts of reactants were charged to the reactor: 679.7 grams (3.5 mole) DMT, 305.6 grams (4.9 mole) EG, 302.5 grams (2.1 mole) CHDM and 2.06 mL of a 3.30% (w/v) solution of titanium isopropoxide in n-butanol. The diol interchange step was conducted at 200° C. for one hour and at 210° C. for two hours. The polycondensation step was conducted at a vacuum of 0.5 mm Hg for 45 minutes. The polymer was extruded from the bottom of the reactor. The extruded rod was cooled in an 5° C. water bath and pelletized. The recovered polymer pellets had an inherent viscosity of 0.72 dL/g. The diol component of the polymer consisted of 37 mole % EG, 62 mole % CHDM and 1 mole % DEG. A $T_g$ of 82° C. and a $T_m$ of 225° C. were obtained for the copolymer by DSC analysis. The crystallization haze half-time as measure from the melt phase was 28 minutes. The sample was dried at 65° C. in a dehumidifier drier for about 16 hours and injection molded into clear specimens set forth in Example 1.

Example 4—Comparative—Preparation of Copolyester containing terephthalate, EG and 81 mole % CHDM The apparatus and procedure set forth in Example 1 was used. The following amounts of reactants were charged to the reactor: 679.2 grams (3.5 mole) DMT, 248.1 grams (4.0 mole) EG, 432.9 grams (3.0 mole) CHDM and 2.38 mL of a 3.30% (w/v) solution of titanium isopropoxide in n-butanol. The diol interchange step was conducted at 200° C. for one hour and at 210° C. for two hours. The polycondensation step was conducted at a vacuum of 0.5 mm Hg for 40 minutes. The polymer was extruded from the bottom of the reactor, cooled in an 5° C. water bath and pelletized. The recovered polymer pellets had an inherent viscosity of 0.76 dL/g and the diol component of the polymer consisted of 18 mole % EG, 81 mole % CHDM and 1 mole % DEG. A $T_g$ of 87° C. and a $T_m$ of 257° C. were obtained for the copolymer by DSC analysis. The crystallization haze half-time as measured from the melt phase was 3 minutes. The sample was dried at 150° C. in a dehumidifier drier for about 4 hours and injection molded into clear specimens set forth in Example 1.

Example 5—Comparative—Preparation of Copolyester containing 95 mole % terephthalate, 5 mole % isophthalate and CHDM The apparatus and procedure set forth in Example 1 was used. The following amounts of reactants were charged to the reactor: 645.2 grams (3.3 mole) DMT, 34.1 grams (0.2 mole) dimethyl isophthalate (DMI), 555.7 grams (3.9 mole) CHDM and 2.68 mL of a 3.30% (w/v) solution of titanium isopropoxide in n-butanol. The reactor was purged with nitrogen and heated to 300° C. under a slow nitrogen sweep with agitation. The reactor temperature was held for 30 minutes and then the nitrogen purge was removed and a vacuum was applied such that a vacuum of <0.5 mm Hg was attained over a 30 minute period. The vacuum and temperature was held for 50 minutes. The polymer was extruded from the bottom of the reactor. The extruded rod was cooled in an 5° C. water bath and pelletized. The recovered polymer pellets had an inherent viscosity of 0.78 dL/g and the polymer consisted of 95 mole % terephthalate and 5 mole % isophthalate as measured by $^1$H NMR. A $T_g$ of 92° C. and a $T_m$ of 287° C. were obtained for the copolymer by DSC analysis. The crystallization haze half-time as measured from the melt phase was 0.5 minutes. The sample was dried at 150° C. in a dehumidifier drier for about 4 hours and injection molded into clear specimens set forth in Example 1.

Example 6—Example of the Invention—Preparation Copolyester Containing 83 Mole % terephthalate, 17 Mole % isophthalate and CHDM The apparatus and procedure set forth in Example 1 was used. The following amounts of reactants were charged to the reactor: 577.3 grams (3.0 mole) DMT, 101.9 grams (0.5 mole) DMI, 565.4 grams (3.9 mole) CHDM and 2.67 mL of a 3.30% (w/v) solution of titanium isopropoxide in n-butanol. The reactor was purged with nitrogen and heated to 290° C. under a slow nitrogen sweep with agitation. The reactor temperature was held for 30 minutes and then the nitrogen purge was removed and a vacuum was applied such that a vacuum of <0.5 mm Hg was attained over a 30 minute period. The vacuum and temperature was held for 43 minutes. The polymer was extruded from the bottom of the reactor, cooled in an 5° C. water bath and pelletized. The recovered polymer pellets had an inherent viscosity of 0.70 dL/g and the polymer consisted of 83 mole % terephthalate and 17 mole % isophthalate as measured by $^1$H NMR. A $T_g$ of 89° C. and a $T_m$ of 262° C. were obtained for the copolymer by DSC analysis. The crystallization haze half-time as measured from the melt phase was 1.5 minutes. The sample was dried at 150° C. in a dehumidifier drier for about 4 hours and injection molded into clear specimens set forth in Example 1.

Example 7—Example of the Invention—Preparation of Copolyester containing 70 mole % terephthalate, 30 mole % isophthalate and CHDM The apparatus and procedure set, forth in Example 1 was used. The following amounts of reactants were charged to the reactor: 476.3 grams (2.5 mole) DMT, 204.1 grams (1.0 mole) DMI, 555.8 grams (3.9 mole) CHDM and 2.67 mL of a 3.30% (w/v) solution of titanium isopropoxide in n-butanol. The reactor was purged with nitrogen and heated to 290° C. under a slow nitrogen sweep with agitation. The reactor temperature was held for 30 minutes and then the nitrogen purge was removed and a vacuum was applied such that a vacuum of <0.5 mm Hg was attained over a 30 minute period. The vacuum and temperature was held for 53 minutes. The polymer was extruded from the bottom of the reactor. The extruded rod was cooled in an 5° C. water bath and pelletized. The recovered polymer pellets had an inherent viscosity of 0.70 dL/g and the polymer consisted of 70 mole % terephthalate and 30 mole % isophthalate as measured by $^1$H NMR. An amorphous polymer was recovered that had a Tg of 87° C. as measured by DSC. The crystallization haze half-time as measured from the melt phase was 6.8 minutes. The sample was dried at 65° C. in a dehumidifier drier for about 4 hours and injection molded into clear specimens set forth in Example 1.

Example 8—Example of the Invention—Preparation of Copolyester containing 61 mole % terephthalate, 39 mole % 1,4-cyclohexanedicarboxylate and CHDM The apparatus and procedure set forth in Example 1 was used. The following amounts of reactants were charged to the reactor: 404.7 grams (2.1 mole) DMT, 243.6 grams (1.4 mole) of dimethyl 1,4-cyclohexanedicarboxylate (DMCD) (35% trans isomer/65% cis isomer), 580.4 grams (4.03 mole) of CHDM and 2.65 mL of a 3.30% (w/v) solution of titanium isopropoxide in n-butanol. The reactor was purged with nitrogen and heated to 220° C. for 60 minutes under a slow nitrogen sweep with sufficient agitation. After raising the temperature to 290° C. the nitrogen purge was removed and a vacuum was applied such that a vacuum of <0.5 mm Hg was attained in 30 min. The vacuum and temperature was held for 120 minutes to perform the polycondensation. The vacuum was then displaced with a nitrogen atmosphere and the polymer was drained from the bottom of the reactor, cooled in an 5° C. water bath and pelletized. An inherent viscosity of 0.70 dL/g was determined for the recovered polymer. The polymer contained 61 mole % terephthalate and 39 mole % 1,4-cyclohexanedicarboxylate (51% trans isomer/49% cis isomer) as measured by $^1$H NMR. A $T_g$ of 72° C. and a $T_m$ of 223° C. were obtained for the copolymer by DSC analysis. The crystallization haze half-time as measured from the melt phase was 15 minutes. The sample was dried at 65° C. in a dehumidifier drier for about 4 hours and injection molded into clear specimens set forth in Example 1.

Example 9—Example of the Invention—Preparation of Copolyester containing 52 mole % terephthalate, 48 mole % 1,4-cyclohexanedicarboxylate and CHDM The apparatus and procedure set forth in Example 1 was used. The following amounts of reactants were charged to the reactor: 404.7 grams (2.1 mole) of dimethyl terephthalate (DMT), 243.6 grams (1.4 mole) of dimethyl 1,4-cyclohexanedicarboxylate (95% trans isomer/5% cis isomer), 580.4 grams (4.03 mole) of CHDM and 2.68 mL of a 3.30% (w/v) solution of titanium isopropoxide in n-butanol. The reactor was purged with nitrogen and heated to 290° C. under a slow nitrogen sweep with agitation. The reactor temperature was held for 30 minutes and then the nitrogen purge was removed and a vacuum was applied such that a vacuum of <0.5 mm was attained over a 30 minute period. The vacuum and temperature was held for 53 minutes. The polymer was extruded from the bottom of the reactor through an orifice. The extruded rod was cooled in an 5° C. water bath and pelletized. An inherent viscosity of 0.74 dL/g was determined for the recovered polymer. The polymer contained 52 mole % terephthalate and 48 mole % 1,4-cyclohexanedicarboxylate (88% trans isomer/12% cis isomer) as measured by $^1$H NMR. A glass transition temperature $T_g$ of 78° C. and a $T_m$ of 225° C. were obtained for the polymer by DSC analysis. The crystallization haze half-time as measured from the melt phase was 11.5 minutes. The sample was dried at 65° C. in a dehumidifier drier for about 4 hours and injection molded into clear specimens set forth in Example 1.

Example 10—Example of the Invention—Preparation of Copolyester containing 70 mole % terephthalate, 30 mole % 2,6-naphthalenedicarboxylate and CHDM The apparatus and procedure set forth in Example 1 was used. The following amounts of reactants were charged to the reactor: 477.0 grams (2.5 mole) DMT, 203.9 grams (1.0 mole) DMI, 565.4 grams (3.9 mole) CHDM and 2.67 mL of a 3.30% (w/v) solution of titanium isopropoxide in n-butanol. The reactor was purged with nitrogen and heated to 290° C. under a slow nitrogen sweep with agitation. The reactor temperature was held for 30 minutes and then the nitrogen purge was removed and a vacuum was applied such that a vacuum of <0.5 mm was attained over a 30 minute period. The vacuum and temperature was held for 43 minutes. The polymer was extruded from the bottom of the reactor. The extruded rod was cooled in a 5° C. water bath and pelletized. The recovered polymer pellets had an inherent viscosity of 0.64 dL/g and the polymer consisted of 70 mole % terephthalate and 30 mole % naphthalate as measured by $^1$H NMR. A T$_g$ of 103° C. and a T$_m$ of 246° C. were obtained for the polymer by DSC analysis. The crystallization haze half-time as measured from the melt phase was 9 minutes. The sample was dried at 85° C. in a dehumidifier drier for about 4 hours and injection molded into clear specimens set forth in Example 1.

Example 11—Example of the Invention—Preparation of Copolyester containing 68 mole % terephthalate, 32 mole % 1,4-cyclohexanedicarboxylate and CHDM The apparatus and procedure set forth in Example 1 was used. The following amounts of reactants were charged to the reactor: 461.8 grams (2.4 mole) of dimethyl terephthalate (DMT), 224.0 grams (1.1 mole) of dimethyl 1,4-cyclohexanedicarboxylate (95% trans isomer/5% cis isomer), 580.4 grams (4.03 mole) of CHDM and 2.68 mL of a 3.30% (w/v) solution of titanium isopropoxide in n-butanol. The reactor was purged with nitrogen and heated to 290° C. under a slow nitrogen sweep with agitation. The reactor temperature was held for 30 minutes and then the nitrogen purge was removed and a vacuum was applied such that a vacuum of <0.5 mm was attained over a 30 minute period. The vacuum and temperature was held for 50 minutes. The polymer was extruded from the bottom of the reactor through an orifice. The extruded rod was cooled in an 5° C. water bath and pelletized. An inherent viscosity of 0.70 dL/g was determined for the recovered polymer. The polymer contained 68 mole % terephthalate and 32 mole % 1,4-cyclohexanedicarboxylate (89% trans isomer/11% cis isomer) as measured by $^1$H NMR. A glass transition temperature T$_g$ of 82° C. and a T$_m$ of 245° C. were obtained for the polymer by DSC analysis. The crystallization haze half-time from the melt was 2 minutes. The sample was dried at 65° C. in a dehumidifier drier for about 4 hours and injection molded into clear specimens set forth in Example 1.

II. PREPARATION FOR AND PERFORMANCE OF STRESS CRACKING RESISTANCE METHODS USING PEPPERMINT OIL AND TOOTHPASTE SOLUTION

A. Preparation of Toothpaste Solution

A toothpaste solution using Toothpaste A as described in the following Tables was prepared using the following procedure. In a 500 ml container, 50 grams of solid toothpaste was added 120 ml of plain tap water. The mixture was sealed and then stirred using a magnetic stirring bar and a magnetically driven stirring plate. After a 30 minute mixing time the dispersion was applied to the test specimens using an applicator brush and observed. The same toothpaste solution was used throughout each testing cycle. The following morning the test specimens from Examples 1–10 were inspected and ranked on their appearance using the craze ranking system. Crazes are precursors to cracks which form due to the interaction of the solvent with the polymer matrix. Crazes are similar to cracks, but crazes contain highly oriented fibrils of polymer which span its faces. Crazes are not necessarily structural defects, but often lead to the formation of true cracks. After the ranking, the test specimens were wetted with the toothpaste solution. The specimens were wet with the toothpaste solution 8 hours later and observed the following morning.

The stress crack resistance to pepper mint oil was determined using the same methodology as the toothpaste solution testing.

Peppermint oil has the following composition:

| Peppermint Oil Composition | |
|---|---|
| Compound | Weight Percent |
| Dimethylsulfide | 0.02 |
| 2 Methyl propanal | 0.03 |
| 3 methyl propanal | <0.01 |
| 2 Methyl butanal | <0.01 |
| 3 Methyl butanal | 0.15 |
| 2 Ethyl furan | 0.03 |
| trans-2,5-Diethyl THF | 0.02 |
| α-Pinene | 0.66 |
| Sabinene | 0.42 |
| Myrcene | 0.18 |
| α-Terpinene | 0.34 |
| Limonene | 1.33 |
| 1,8 Cineole | 4.80 |
| trans-Ocimene | 0.03 |
| cis-Ocimene | 0.31 |
| G-Terpinene | 0.56 |
| trans-2-Hexenal | 0.07 |
| para-Cymeme | 0.10 |
| Terpeniolene | 0.16 |
| Hexanol | 0.13 |
| 3 Octyl acetate | 0.03 |
| cis-3-Hexenol | 0.01 |
| 3-Octanol | 0.21 |
| trans-2-Hexenol | 0.02 |
| Sabinene hydrate | 0.80 |
| Menthone | 20.48 |
| Menthofuran | 1.67 |
| D-Isomenthone | 2.77 |
| B-Bourbonol | 0.37 |
| Neomenthylacetate | 0.21 |
| Linalool | 0.26 |
| cis-Sabinene hydrate | 0.07 |
| Menthyl acetate | 5.02 |
| Isopulegol | 0.07 |
| Neoisomenthyl acetate | 0.26 |
| Neomenthol | 3.34 |
| β-Caryophyllene | 2.13 |
| Terpinene-4-ol | 0.98 |
| Neoisoisopulegol | 0.03 |
| Neoisomenthol | 0.78 |
| Menthol | 43.18 |
| Pulegone | 0.77 |
| tran-β Farenscene | 0.29 |
| Isomenthol | 0.19 |
| Humelene | 0.03 |
| α-Terpineol | 0.16 |
| Germacrene-D | 2.29 |
| Piperitone | 0.96 |
| Viridiflorol | 0.26 |
| Eugenol | 0.02 |
| Thymol | 0.04 |

B. Toothpaste and Peppermint Oil Resistance Testing of Molded Articles

Figure 2:
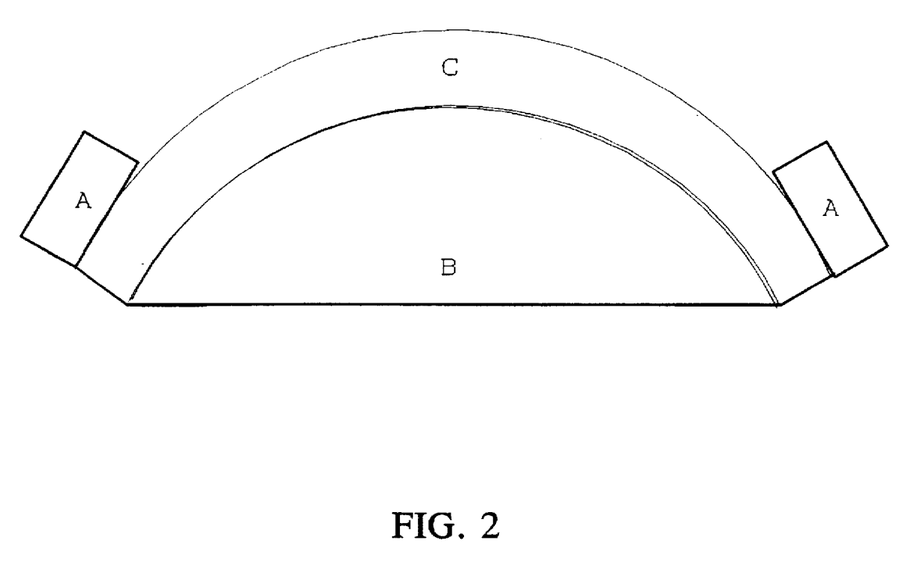
FIG. 2 illustrates the testing apparatus used to determine stress crack resistance

Plaques molded from Examples 1–10 were mounted in a testing rig shown in FIG. 2. In FIG. 2 the parts labelled A are clamps to hold the test specimen. B is the curved portion of the rig which determines the strain the test specimens are under and C is the molded plaque under strain. The testing rig was configured such that the flexural strain on each specimen is 2.7%. The testing rigs were used to simulate end-use conditions such as bristle insertion. The specimens remained in the testing rigs for 7 days and observed each day for the formation of crazes. A ranking system from 1–3 was used to identify the severity of crazing on each specimen. (visual observation codes as referred to herein). In this system, visual observation code 1 was assigned to test plaques that exhibit no change during the testing period. As the severity of crazing increases the ranking increases in value.

Table 1 illustrates the effect of 2.7% flexural strain on the test specimens fabricated from pellets of Examples 1-5. No effect was observed on all test specimens. This indicates that placement of the test specimens in the testing apparatus does not induce crazing.

The effect of the toothpaste solution on Examples 1-5 under flexural strain are shown in Table 2. The data in Table 2 indicates that as the CHDM content of the copolyesters is increased relative to the EG content the resistance to stress cracking of the test specimen improves. At high levels of CHDM as illustrated by Examples 4 and 5, no effect was observed. The same trend was observed when peppermint oil was used as the chemical agent as shown in Table 3.

The data in Tables 2 and 3 indicate that Examples 4 and 5 have superior resistance to stress cracking when exposed to toothpaste solution and peppermint oil under flexural strain than Examples 1-3. Examples 3, 4 and 5 were injection molded into cylindrically shaped articles that were approximately 20 cm in length. The diameter of each article varied between 5 and 11.5 mm. The molded articles prepared from Example 3 were clear throughout. The molded articles prepared from Examples 4 and 5 were not completely clear. They contained opaque sections, generally in the area of the article with the largest diameter. This result indicated that the copolyesters represented by Examples 4 and 5 are resistance to stress cracking however; molded articles with thick sections of materials in Examples 4 and 5 were not preferred.

In Table 4, the effect of 2.7% flexural strain on specimens fabricated from Examples 6-10 is shown. The data in Table 4 indicates that placement of the test specimens in the testing apparatus does not induce crazing. The data in Table 5 indicates that the plaques molded from Examples 6-10 do not show any effect when tested under flexural strain in the presence of toothpaste solution. The data in Table 6 indicates that Examples 6-10 all show improved stress crack resistance to peppermint oil under flexural strain than Examples 1-3. Pellets from Examples 6-10 were injection molded into cylindrically shaped articles 20 cm long. The diameter of each article varied between 5 and 11.5 mm. The molded articles prepared from Example 6 contained opaque sections particularly in the thickest sections, while the articles prepared from Examples 7-10 were clear throughout. This result indicates that certain copolyesters can be used to produce molded articles with thick sections that have excellent clarity and are resistance to stress cracking by toothpaste and peppermint oil.

Pellets from Example 6 were injection molded into cylindrically shaped articles 20 cm long. The diameter of each article varied between 5 and 7 mm. The molded articles were clear throughout. This result indicates that certain copolyesters can be used to produce molded articles that have excellent clarity and are resistant to stress cracking by toothpaste and peppermint oil.

TABLE 1

Effect of 2.7% Flexural Strain on Copolyesters Without Use of Toothpaste A Solution or Peppermint Oil

| Time (hrs.) | Example 1 | Example 2 | Example 3 | Example 4 | Example 5 |
|---|---|---|---|---|---|
| 18 | 1 | 1 | 1 | 1 | 1 |
| 42 | 1 | 1 | 1 | 1 | 1 |
| 66 | 1 | 1 | 1 | 1 | 1 |
| 90 | 1 | 1 | 1 | 1 | 1 |

TABLE 1-continued

Effect of 2.7% Flexural Strain on Copolyesters Without Use of Toothpaste A Solution or Peppermint Oil

| Time (hrs.) | Example 1 | Example 2 | Example 3 | Example 4 | Example 5 |
|---|---|---|---|---|---|
| 162 | 1 | 1 | 1 | 1 | 1 |
| 186 | 1 | 1 | 1 | 1 | 1 |

Visual Observation Codes:

1 = No effect

2 = test specimen is lightly crazed. Crazes are shallow and randomly located

3 = test specimen is heavily crazed. Crazes are deep and randomly located

TABLE 2

Effect of Toothpaste A Solution on Copolyesters at 2.7% Flexural Strain

| Time (hrs.) | Example 1 | Example 2 | Example 3 | Example 4 | Example 5 |
|---|---|---|---|---|---|
| 18 | 3 | 3 | 3 | 1 | 1 |
| 42 | 3 | 3 | 3 | 1 | 1 |
| 66 | 3 | 3 | 3 | 1 | 1 |
| 90 | 3 | 3 | 3 | 1 | 1 |
| 162 | 3 | 3 | 3 | 1 | 1 |
| 186 | 3 | 3 | 3 | 1 | 1 |

Visual Observation Codes:

1 = No effect

2 = test specimen is lightly crazed. Crazes are shallow and randomly located

3 = test specimen is heavily crazed. Crazes are deep and randomly located

TABLE 3

Effect of Peppermint Oil on Copolyesters at 2.7% Flexural Strain

| Time (hrs.) | Example 1 | Example 2 | Example 3 | Example 4 | Example 5 |
|---|---|---|---|---|---|
| 2 | 3S | 3S | 3S | 2 | 2 |
| 18 | 3S | 3S | 3S | 2 | 2 |
| 42 | 3S | 3S | 3S | 2 | 2 |
| 66 | 3S | 3S | 3S | 2 | 2 |
| 90 | 3S | 3S | 3S | 2 | 2 |
| 114 | 3S | 3S | 3S | 2 | 2 |

Visual Observation Codes:

1 = No effect

2 = test specimen is lightly crazed. Crazes are shallow and randomly located

3 = test specimen is heavily crazed. Crazes are deep and randomly located

S = test specimen swelled

TABLE 4

Effect of 2.7% Flexural Strain on Copolyesters Without the Use of Toothpaste Solution or Peppermint Oil

| Time (hrs.) | Example 6 | Example 7 | Example 8 | Example 9 | Example 10 | Example 11 |
|---|---|---|---|---|---|---|
| 18 | 1 | 1 | 1 | 1 | 1 | 1 |
| 42 | 1 | 1 | 1 | 1 | 1 | 1 |
| 66 | 1 | 1 | 1 | 1 | 1 | 1 |
| 90 | 1 | 1 | 1 | 1 | 1 | 1 |
| 162 | 1 | 1 | 1 | 1 | 1 | 1 |
| 186 | 1 | 1 | 1 | 1 | 1 | 1 |

Visual Observation Codes:
1 = No effect
2 = test specimen is lightly crazed. Crazes are shallow and randomly located
3 = test specimen is heavily crazed. Crazes are deep and randomly located

TABLE 5

Effect of Toothpaste A Solution on Copolyesters at 2.7% Flexural Strain

| Time (hrs.) | Example 6 | Example 7 | Example 8 | Example 9 | Example 10 |
|---|---|---|---|---|---|
| 18 | 1 | 1 | 1 | 1 | 1 |
| 42 | 1 | 1 | 1 | 1 | 1 |
| 66 | 1 | 1 | 1 | 1 | 1 |
| 90 | 1 | 1 | 1 | 1 | 1 |
| 162 | 1 | 1 | 1 | 1 | 1 |
| 186 | 1 | 1 | 1 | 1 | 1 |

Visual Observation Codes:
1 = No effect
2 = test specimen is lightly crazed. Crazes are shallow and randomly located
5 = test specimen is heavily crazed. Crazes are deep and randomly located

TABLE 6

Effect of Peppermint Oil on Copolyesters at 2.7% Flexural Strain

| Time (hrs.) | Example 6 | Example 7 | Example 8 | Example 9 | Example 10 |
|---|---|---|---|---|---|
| 1 | 2 | 2 | 3S | 2 | 2 |
| 22 | 2 | 2 | 3S | 2 | 3 |
| 46 | 2 | 2 | 3S | 2 | 3 |
| 70 | 2 | 2 | 3S | 2 | 3 |
| 94 | 2 | 2 | 3S | 2 | 3 |
| 118 | 2 | 2 | 3S | 2 | 3 |

Visual Observation Codes:
1 = No effect
2 = test specimen is lightly crazed. Crazes are shallow and randomly located
3 = test specimen is heavily crazed. Crazes are deep and randomly located
S = test specimen swelled

Comparison of Tensile Strength of Molded Articles Before and After Exposure to Toothpaste Solution In Tables 7 and 8, the effect of the toothpaste solutions on retained tensile strength are displayed. Pellets of the examples listed in the tables were molded into tensile bars of 0.32 cm thickness as per ASTM method D638. One sample of the bars was tested as per ASTM D638 without any exposure to the toothpaste solution to establish a control standard. Additional bars were held in the strain rig described in the previous section at flexural strains of either 1.4% and 2.7%. The toothpaste solution was applied to these bars for one week as described in the previous section. After exposure, the bars were removed from the rig and tested per ASTM D638. The ratio of tensile strength of the exposed specimen to the tensile strength of the control standard multiplied times 100% is the percent retained strength. Any Example which shows a retained strength of more than 90%, preferably, more than 95%, more preferably, more than 98%, and even more preferably, 100%, is deemed to possess sufficient chemical resistance for toothbrush applications.

The data in Table 7 confirm that Examples 1–3 possess inferior chemical resistance after exposure to Toothpaste A. The data in Table 8 show how increasing the flavorant level in the toothpaste affect Examples 2, 3, 6 and 11. The flavorant level was determined to be the total percentage of Limonene, Cineole, Methone, Menthol and Carvone, as determined by gas chromatography combined with mass spectroscopy. The levels of these components are also listed in Table 8. These five components are the chief compounds present in peppermint and spearmint oils. Levels of other components are listed in Table 9.

TABLE 7

| | Percentage of Retained Strength* | |
|---|---|---|
| Example | @ 1.4% Flexural Strain | @ 2.7% Flexural Strain |
| 1 | 30 | 27 |
| 2 | 0 | 0 |
| 3 | 38 | 0 |
| 4 | 98 | 98 |
| 5 | 100 | 100 |
| 6 | 100 | 100 |
| 7 | 100 | 100 |
| 8 | 100 | 100 |
| 9 | 100 | 100 |
| 10 | 100 | 100 |
| 11 | 100 | 100 |

TABLE 8

|  | Percent By Weight Flavorant | Example 2 VO Code* (% Retained Strength) | Example 3 VO Code* (% Retained Strength) | Example 6 VO Code* (% Retained Strength) | Example 11 VO Code* (% Retained Strength) |
|---|---|---|---|---|---|
| Toothpaste A* | 0.800% | 3 (0%) |  | 1 (100%) | 1 (100%) |
| Toothpaste B* | 0.475% | 1 (97%) | 2 (98%) | 1 (100%) | 1 (100%) |
| Toothpaste C* | 0.685% | 2 (81%) | 2 (98%) | 1 (100%) | 1 (100%) |
| Toothpaste D* | 0.480% | 2 (67%) |  | 1 (100%) | 1 (100%) |
| Toothpaste E* | 0.845% | 3 (0%) | 3 (0%) | 1 (100%) | 1 (100%) |
| Toothpaste F* | 0.740% | 3 (0%) |  | 1 (100%) | 1 (100%) |

Flavorant Compositions by Weight Percentages for Toothpastes A–F:

|  | Limonene | Cineole | Menthone | Menthol | Carvone | Total |
|---|---|---|---|---|---|---|
| Toothpaste A: | <0.01 | 0.02 | 0.105 | 0.67 | 0.01 | 0.800 |
| Toothpaste B: | 0.02 | <0.01 | 0.01 | 0.215 | 0.23 | 0.475 |
| Toothpaste C: | <0.01 | 0.015 | 0.09 | 0.57 | 0.01 | 0.685 |
| Toothpaste D: | 0.01 | <0.01 | 0.05 | 0.31 | 0.11 | 0.480 |
| Toothpaste E: | 0.02 | 0.035 | 0.245 | 0.465 | 0.08 | 0.845 |
| Toothpaste F: | 0.02 | 0.035 | 0.19 | 0.485 | 0.01 | 0.740 |

VO Code* = Visual Observation Code

TABLE 9

CONCENTRATION (WEIGHT %) OF OTHER COMPOUNDS DETECTED IN TOOTHPASTES BY GAS CHROMATOGRAPHY/MASS SPECTROSCOPY

|  | Glycerin | Comp. 1 | Comp. 2 | Comp. 3 | Comp. 4 | Comp. 5 | Comp. 6 | Comp. 7 | Comp. 8 | Comp 9 | Comp 10 |
|---|---|---|---|---|---|---|---|---|---|---|---|
| Toothpaste A | 21.62 | 0.01 |  | 0.025 | 0.025 | 0.085 | 0.275 | 0.115 |  |  | 0.07 |
| Toothpaste B | 18.06 |  |  |  | 0.01 | 0.055 | 0.155 |  | 0.55 | 0.01 |  |
| Toothpaste C | 9.52 |  |  | 0.02 |  | 0.095 | 0.175 | 0.11 | 0.06 | 0.03 |  |
| Toothpaste D | 8.98 | 0.07 | 0.01 | 0.01 |  | 0.065 | 0.275 |  | 0.105 | 0.05 | 0.05 |
| Toothpaste E | 21.67 | 0.05 | 0.01 | 0.05 | 0.025 | 0.01 | 0.28 |  | 0.13 |  | 0.08 |
| Toothpaste F | 12.15 | 0.04 | 0.01 | 0.04 |  | 0.04 | 0.14 |  | 0.065 |  | 0.01 |

Compound (Comp.) Identification
1 1-HO-2-Propanone
2 3-Octanol
3 4-Methyl-1-(1-methylethyl)cyclohexene
4 Pulegone
5 Dodecanol (isomer 1)
6 Dodecanol (isomer 2)
7 3-Phenyl-2-propenal
8 Dodecanol (isomer 3)
9 Eugenol The invention has been described in detail with particular reference to preferred embodiments thereof, but it will be understood that variations and modifications can be effected within, the spirit and scope of the invention. Moreover, all patents, patent applications (published and unpublished, foreign or domestic), literature references or other publications noted above are incorporated herein by reference for any disclosure pertinent to the practice of this invention.

We claim:

1. A molded object prepared from a copolyester having an inherent viscosity of 0.4 to, 1.1 dL/g,
   wherein the acid component comprises repeat units from 90 to 40 mole % terephthalic acid and from 10 to 60 mole % of one or more additional dibasic acids selected from the group consisting of isophthalic acid, cyclohexanedicarboxylic acid, naphthalenedicarboxylic acid, diphenyldicarboxylic acid, and stilbenedicarboxylic acid;
   wherein the glycol component comprises repeat units from 1.4-cyclohexanedimethanol.

2. The molded object of claim 1 wherein said acid component comprises repeat units of 85 to 52 mole % terephthalic acid and 15 to 48 mole % of one or more of said additional dibasic acids.

3. The molded object of claim 2 wherein said acid component comprises repeat units of 83 to 52 mole % terephthalic acid and 17 to 48 mole % of one or more of said additional dibasic acids.

4. The molded object of claim 1 wherein said one or more of said additional dibasic acids comprises isophthalic acid, cyclohexanedicarboxylic acid, naphthalenedicarboxylic acid.

5. The molded object of claim 4 wherein one or more of said additional dibasic acids is isophthalic acid.

6. The molded object of claim 4 wherein one or more of said additional dibasic acids is 1,3-cyclohexanedicarboxylic acid.

7. The molded object of claim 4 wherein one or more of said additional dibasic acids comprises 1,4-cyclohexanedicarboxylic acid.

8. The molded object of claim 4 wherein one or more said additional dibasic acids is naphthalenedicarboxylic acid.

9. The molded object of claim 8 wherein said naphthalenedicarboxylic acid is selected from the group consisting of 2,6-naphthalenedicarboxylic acid, 2,7-naphthalenedicarboxylic acid, 1,4-naphthalenedicarboxylic acid, and 1,5-naphthalenedicarboxylic acid.

10. The molded object of claim 1 comprising up to 10 mole % of even further additional dibasic acids.

11. The molded object of claim 10 wherein said even further additional dibasic acids are selected from one or more of the group consisting aromatic dicarboxylic acids having 8 to 14 carbon atoms, aliphatic dicarboxylic acids having 4 to 12 carbon atoms, and cycloaliphatic dicarboxylic acids having 8 to 12 carbon atoms.

12. The molded object of claim 11 wherein said even further additional dibasic acids are selected from one or more of the group consisting of phthalic acid, cyclohexanediacetic acid, succinic acid, glutaric acid, adipic acid, azelaic acid and sebacic acid.

13. The molded object of claim 1 wherein said glycol component comprises 70 to 100 mole % 1,4-cyclohexanedimethanol.

14. The molded object of claim 13 wherein said glycol component comprises 80 to 100 mole % 1,4-cyclohexanedimethanol.

15. The molded object of claim 14 wherein said glycol component comprises 85 to 100 mole % 1,4-cyclohexanedimethanol.

16. The molded object of claim 15 wherein said glycol component comprises 90 to 100 mole % 1,4-cyclohexanedimethanol.

17. The molded object of claim 16 wherein said glycol component comprises 95 to 100 mole % 1,4-cyclohexanedimethanol.

18. The molded object of claim 13 wherein said glycol component contains up to 30 mole % of one or more additional aliphatic or alicyclic glycols.

19. The molded object of claim 18 wherein said one or more additional glycols is selected from the group consisting of ethylene glycol, diethylene glycol, triethylene glycol, propanediol, butanediol, pentanediol, hexanediol, neopentyl glycol and tetramethylcyclobutanediol.

20. The molded object of claim 19 wherein said one or more additional glycols comprises ethylene glycol.

21. The molded object of claim 1 having a crystallization haze half-time of greater than 1 minute.

22. The molded object of claim 1 having a crystallization haze half-time of greater than 3 minutes.

23. The molded object of claim 21 which is visually clear for portions of said object having a thickness of from 1 to 11.5 mm.

24. The molded object of claim 22 having a crystallization haze half-time of greater than 5 minutes.

25. The molded object of claim 23 which is visually clear for portions of said object having a thickness of from 5 to 11.5 mm.

26. The molded object of claim 1 prepared from said copolyester having a diffuse transmittance value of less than about 60% as determined by ASTM Method D1003.

27. The molded object of claim 1 having improved stress cracking resistance as determined for test specimens which are 0.32 centimeters thick under a flexural load with 2.7% strain.

28. The molded object of claim 27 wherein said molded object has improved stress cracking resistance as determined for test specimens which are 0.32 centimeters thick under a flexural load with 2.7% strain.

29. The molded object of claim 26 wherein said molded object has improved stress cracking resistance as determined for test specimens which are 0.32 centimeters thick under a flexural load with 2.7% strain and which are contacted with toothpaste solution comprising 0.6 weight % flavorant as determined by gas chromatography.

30. The molded object of claim 29 wherein said toothpaste solution comprises:
  (a) water and
  (b) a toothpaste comprising 0.6 weight % mint oil.

31. The molded object of claim 30 wherein said molded object is contacted with said toothpaste solution for 18 to 186 hours.

32. The molded object of claim 29 wherein said molded object is contacted with said flavorant for 1 to 118 hours.

33. The molded object of claim 32 wherein said molded object is contacted with flavorant for 1 to 6 hours.

34. The molded object of claim 29 wherein said flavorant is selected from the group consisting of peppermint oil, spearmint oil, curly mint oil, anise oil, Japanese anise oil, caraway oil, eucalyptus oil, fennel oil, cinnamon oil, clove oil, geranium oil, sage oil, pimento oil, thyme oil, and majoram oil.

35. The molded object of claim 34 wherein said flavorant is selected from mint, oil.

36. The molded object of claim 35 wherein said mint oil comprises a component selected from the group consisting of limonene, cineole, menthone, menthol, and carvone.

37. The molded object of claim 35 wherein said mint oil comprises peppermint oil.

38. The molded object of claim 29 wherein said flavorant contains synthetic ingredients.

39. The molded object of claim 38 wherein said synthetic ingredient is menthol.

* * * * *

UNITED STATES PATENT AND TRADEMARK OFFICE
CERTIFICATE OF CORRECTION

PATENT NO. : 5,633,340

DATED : May 27, 1997

INVENTOR(S) : Douglas C. Hoffman, et al.

It is certified that error appears in the above-indentified patent and that said Letters Patent is hereby corrected as shown below:

Column 16, line 66 (Claim 7, line 2), "comprises" should read --- is ---.

Column 18, line 41 (Claim 35, line 2), "mint, oil" should read --- mint oil ---.

Signed and Sealed this

Twenty-third Day of September, 1997

*Attest:*

BRUCE LEHMAN

*Attesting Officer*   *Commissioner of Patents and Trademarks*